(12) United States Patent
Cardoso et al.

(10) Patent No.: US 8,158,251 B2
(45) Date of Patent: Apr. 17, 2012

(54) ARTICLE WITH NON-STICK FINISH AND IMPROVED SCRATCH RESISTANCE

(75) Inventors: Nelson Leonardo Giani Cardoso, Mechelen (BE); Philippe Andre Fernand Thomas, Helecine (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 399 days.

(21) Appl. No.: 12/365,243

(22) Filed: Feb. 4, 2009

(65) Prior Publication Data

US 2009/0202782 A1  Aug. 13, 2009

Related U.S. Application Data

(60) Provisional application No. 61/026,811, filed on Feb. 7, 2008.

(51) Int. Cl.
*B32B 27/06* (2006.01)
*B32B 27/20* (2006.01)
*B32B 27/34* (2006.01)

(52) U.S. Cl. .............. 428/325; 428/421; 428/473.5

(58) Field of Classification Search .............. None
See application file for complete search history.

(56) References Cited

U.S. PATENT DOCUMENTS

| 4,014,834 | A | 3/1977 | Concannon |
|---|---|---|---|
| 4,380,618 | A | 4/1983 | Khan et al. |
| 4,897,439 | A | 1/1990 | Rau et al. |
| 5,079,073 | A | 1/1992 | Tannenbaum |
| 5,468,798 | A | 11/1995 | Leech |
| 5,560,978 | A | 10/1996 | Leech |
| 6,133,359 | A * | 10/2000 | Bate et al. .............. 524/430 |
| 6,291,054 | B1 | 9/2001 | Thomas et al. |
| 6,761,964 | B2 | 7/2004 | Tannenbaum |
| 2003/0021988 | A1 * | 1/2003 | Tannenbaum .............. 428/336 |
| 2004/0261932 | A1 | 12/2004 | Buffard et al. |
| 2009/0107553 | A1 * | 4/2009 | Hayes et al. .............. 137/1 |

FOREIGN PATENT DOCUMENTS

| EP | 0 252 669 A2 | 1/1988 |
|---|---|---|
| EP | 0 551 996 A1 | 7/1993 |
| EP | 0 724 915 B1 | 8/2001 |
| EP | 1 197 268 A2 | 4/2002 |
| JP | 10-323283 | 5/1997 |
| JP | 3471562 B2 | 12/2003 |
| WO | 94/29395 | 12/1994 |

OTHER PUBLICATIONS

PCT/US2009/033292 International Search Report, May 8, 2009.

\* cited by examiner

*Primary Examiner* — Ramsey Zacharia

(57) ABSTRACT

An article includes a scratch resistant non-stick finish adhered to a substrate. The scratch resistant non-stick finish includes a primer layer, a midcoat layer, and a topcoat layer. The primer layer is adhered to the substrate and includes a first polymer binder and large ceramic particles, the midcoat layer includes a first fluoropolymer composition and inorganic whiskers, and the topcoat layer includes a second fluoropolymer composition.

11 Claims, No Drawings

ARTICLE WITH NON-STICK FINISH AND IMPROVED SCRATCH RESISTANCE

BACKGROUND INFORMATION

1. Field of the Disclosure

This invention relates to articles with non-stick fluoropolymer finishes exhibiting improved scratch resistance.

2. Description of the Related Art

The technology of forming a non-stick fluoropolymer finish on a substrate, such as aluminum, to form a release surface for such applications as cookware has typically involved the use of at least two coats on the substrate, an undercoat typically called a primer to adhere to the substrate, and an overcoat to provide the non-stick coating (finish).

It has become known to incorporate relatively large particles of inorganic, non-metallic particles into the primer layer to increase abrasion resistance of the non-stick finish. European Patent No. 0 724 915 to Bignami discloses the use of cristobilite, which is a $SiO_2$ mineral having a Moh's hardness of 6.5 (corresponds to a Knoop hardness of 820), in the primer layer. U.S. Pat. No. 6,291,054 to Thomas et al. and U.S. Pat. No. 6,761,964 to Tannenbaum disclose the use of large ceramic particles, preferably having a Knoop hardness of at least 1200, in the primer layer.

In addition to abrasion resistance, it is desirable to improve the scratch resistance of non-stick finishes. In U.S. Patent Application No. 2004/0261932 to Buffard et al, small ceramic particles of less that 4 µm diameter with a "quasi-spherical" shape are used in the primer of a non-stick finish in an attempt to improve both scratch and abrasion resistance.

Others have suggested including other types of particles, such as whiskers to improve the performance of non-stick finishes. For example, whisker materials have been used in primers of non-stick coating systems to improve the adhesion of subsequent topcoats. U.S. Pat. No. 5,560,978 to Leech describes a two-coat system with a basecoat (i.e., primer) that includes a high temperature binder resin and a filamentary powder, e.g., a nickel filamentary powder, to form a sponge-like material with a rough surface and an internal structure containing interlocking channels. The advantage of creating this spongelike material with a roughened surface is that it enables a fluoropolymer topcoat to be anchored therein, and thus improves adhesion of the topcoat to the basecoat.

Alternatively, whisker materials have been used in topcoats of non-stick finishes to improve wear resistance. In Japanese Patent No. 3471562(B2) to Maeda et al., potassium hexatitanate whiskers are used in the fluoropolymer topcoat of one-coat and two-coat systems to improve the wear and scratch resistance of the non-stick surface. The coatings of Maeda further include spherical ceramic pigments (i.e., glass beads containing $SiO_2$ and $Al_2O_3$) to improve abrasion resistance.

SUMMARY

In a first aspect, an article includes a scratch resistant non-stick finish adhered to a substrate. The scratch resistant non-stick finish includes a primer layer, a midcoat layer, and a topcoat layer. The primer layer is adhered to the substrate and includes a first polymer binder and large ceramic particles, the midcoat layer includes a first fluoropolymer composition and inorganic whiskers, and the topcoat layer includes a second fluoropolymer composition.

In a second aspect, a liquid coating composition for a non-stick finish includes a fluoropolymer, a polymer binder, and inorganic whiskers. A composition of the inorganic whiskers is in a range of from about 1 to 40 percent by weight of the liquid coating composition.

DETAILED DESCRIPTION

In a first aspect, an article includes a scratch resistant non-stick finish adhered to a substrate. The scratch resistant non-stick finish includes a primer layer, a midcoat layer, and a topcoat layer. The primer layer is adhered to the substrate and includes a first polymer binder and large ceramic particles, the midcoat layer includes a first fluoropolymer composition and inorganic whiskers, and the topcoat layer includes a second fluoropolymer composition.

In one embodiment of the first aspect, the inorganic whiskers include silicon carbide. In another embodiment of the first aspect, the inorganic whiskers have a fiber aspect ratio of at least 3.3. In still another embodiment of the first aspect, the inorganic whiskers have a diameter in the range of from about 0.45 to 3 µm. In yet another embodiment of the first aspect, the inorganic whiskers have a length in the range of from about 5 to 80 µm.

In a further embodiment of the first aspect, a composition of the midcoat layer includes inorganic whiskers in the range of from greater than 0 to 55 percent by weight in a dry film. Preferably, the inorganic whiskers in a dry film are in a range of greater than 0 to 35 wt %. More preferably the inorganic whiskers in a dry film are in a range of 2.2 to less than 27.7 wt %, still more preferably a range of 5.2 to 19.3 wt %, and most preferably a range of 6.3 to 14.0 wt % of the total dry film weight. In still a further embodiment of the first aspect, the large ceramic particles include silicon carbide.

In another embodiment of the first aspect, the midcoat layer further includes a second polymer binder. In a more specific embodiment, a composition of the midcoat layer includes the second polymer binder in the range of from about 1 to 20 percent by weight in a dry film. In another more specific embodiment, the second polymer binder includes polyamide imide.

In still another embodiment of the first aspect, the primer layer further includes a third fluoropolymer composition. In yet still another embodiment of the first aspect, the large ceramic particles have an average particle size in the range of from about 10 to 50 µm.

In a second aspect, a liquid coating composition for a non-stick finish includes a fluoropolymer, a polymer binder, and inorganic whiskers. A composition of the inorganic whiskers is in a range of from greater than 0 to less than 40 percent by weight of the liquid coating composition.

It has been found that unexpected improvement in scratch resistance performance is obtained in a 3-coat non-stick finish system with the combination of large ceramic particles in the primer layer and inorganic whiskers in the midcoat layer. The combined improvement in scratch resistance along with good abrasion resistance performance is greater than that expected based on the individual contributions of the inorganic whiskers in the midcoat layer and the large ceramic particles in the primer layer. As used herein, the term "abrasion resistance" refers to the ability of a non-stick finish system to resist abrasion forces that result in a wearing away of a volume of the coating system that comes in contact with the abrasion forces. Repeated application of abrasion forces can lead to severe loss of coating system thickness. As used herein, the term "scratch resistance" refers to the ability of a non-stick finish system to resist plastic deformation of the coating system that comes in contact with a scratch force. The plastic deformation of a scratch force results in loss of volume of the coating system.

With respect to the inorganic whiskers in the midcoat layer, the material from which the particles are made is one or more ceramic or metallic fiber type materials that are inert with respect to the other components of the non-stick finish system and thermally stable at its eventual baking temperature, which fuses the fluoropolymer. The inorganic whiskers are water insoluble so that they are typically uniformly dispersible but not dissolved in the aqueous or organic medium in which the fluoropolymer is dispersed. The inorganic whiskers preferably have an average particle diameter (nominal) in the range of from about 0.45 to 3 μm, and an average length (nominal) in the range of from about 5 to 80 μm.

The inorganic whiskers typically have a fiber aspect ratio of greater than 3.3. By "fiber aspect ratio" is meant a ratio of the fiber length or dimension (major axis or length) of a whisker to the diameter of the minor dimension (width). The fiber aspect ratio is a means of quantifying a particle shape, and can be used to differentiate the fiber shape of the whisker from other particle morphologies (e.g., spheres, plates, or the irregular shape of the large ceramic particles described below).

Inorganic whiskers can be characterized by their elastic modulus as measured in gigapascals (GPa). Examples of inorganic whiskers with a high elastic modulus that are useful for improving scratch resistance in a non-stick finish system include inorganic oxides, carbides, borides and nitrides, metals such as stainless steel, and combinations thereof. Preferred are inorganic oxides, nitrides, borides and carbides of zirconium, tantalum, titanium, tungsten, boron, aluminum and beryllium. Typical elastic modulus values for preferred compositions are: silicon nitride (310 GPa); stainless steel (180-200 GPa); alumina (428 GPa); boron carbide (483 GPa); silicon carbide (480 GPa). The inorganic whiskers might also be considered as oxides, nitrides, borides, or carbides of a metal element. The inorganic whiskers can be particles of a single ceramic or metal, or a mixture of whiskers of different ceramics or metals. A preferred inorganic whisker is SiC. Another preferred inorganic whisker is $Al_2O_3$.

With respect to the fluoropolymer, the following description applies to the fluoropolymer compositions that may be present in the primer, midcoat, and topcoat layers. The fluoropolymer is a fluorocarbon resin. The fluoropolymer can be non melt-fabricable fluoropolymer with a melt creep viscosity of at least $1 \times 10^7$ Pa·s. One embodiment is polytetrafluoroethylene (PTFE) having a melt creep viscosity of at least $1 \times 10^7$ Pa·s at 380° C. with the highest heat stability among the fluoropolymer. Such non-melt-fabricable PTFE can also contain a small amount of comonomer modifier which improves film-forming capability during baking (fusing), such as perfluoroolefin, notably hexafluoropropylene (HFP) or perfluoro (alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt creep viscosity, usually at least $1 \times 10^8$ Pa·s, but a mixture of PTFE's having different melt viscosities can be used to form the non-stick component.

The fluoropolymer can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro (methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it is sufficient to be film-forming and be able to sustain a molded shape so as to have integrity in the undercoat application. Typically, the melt viscosity will be at least $1 \times 10$ Pa·s and may range up to about $60\text{-}100 \times 10^3$ Pa·s as determined at 372° C. according to ASTM D-1238.

A preferred fluoropolymer composition is a blend of non melt-fabricable fluoropolymer having for example a melt creep viscosity in the range from $1 \times 10^7$ to $1 \times 10^{11}$ Pa·s and melt fabricable fluoropolymer having for example a viscosity in the range from $1 \times 10^3$ to $1 \times 10^5$ Pa·s.

The fluoropolymer composition is selected in the primer and overcoat layers (i.e., midcoat and topcoat layers) so as to be sufficiently compatible with one another to accomplish intercoat adhesion upon baking when fluoropolymer is present in adjacent layers. The fluoropolymer composition of each individual layer may be a blend of one or more fluoropolymers. In some embodiments, each layer (i.e., primer, midcoat, and topcoat) includes a fluoropolymer composition, while in other embodiments, only one or two of these layers includes a fluoropolymer composition. In some embodiments, the fluoropolymer composition in two, or even three layers is the same, while in other embodiments, each layer having a fluoropolymer composition has a different fluoropolymer composition.

The fluoropolymer component is generally commercially available as a dispersion of the polymer in water, which is the preferred form for the primer, midcoat, and, topcoat compositions used in the present invention for ease of application and environmental acceptability. By "dispersion" is meant that the fluoropolymer resin particles are colloidal in size and stably dispersed in the aqueous medium, so that settling of the particles does not occur within the time when the dispersion will be used. This is achieved by the small size of the fluoropolymer particles, typically on the order of less than 0.5 μm, and the use of surfactant in the aqueous dispersion by the dispersion manufacturer. Such dispersions can be obtained directly by the process known as aqueous dispersion polymerization, optionally followed by concentration and/or further addition of surfactant.

Another liquid form of the fluoropolymer to be used to form any of the layers described above is the dispersion of the fluoropolymer in an organic liquid. This is particularly useful when the fluoropolymer is PTFE micropowder, which is a low molecular weight PTFE that has melt—flowability. PTFE micropowder can be used in aqueous dispersion form as well. The aqueous dispersions of fluoropolymer described above can include miscible organic liquid.

With respect to the large ceramic particle component, the ceramic from which the particles are made is one or more inorganic, non-metallic filler type materials that are inert with respect to the other components of the composition and thermally stable at its eventual baking temperature, which fuses the fluoropolymer. The large ceramic particles are water insoluble so that they are typically uniformly dispersible but not dissolved in the aqueous or organic medium in which the fluoropolymer is dispersed. The large ceramic particles preferably have an average particle size of at least about 10 μm, but no greater than about 50 μm.

The large ceramic particles preferably have a Knoop hardness of at least 1200 and more preferably of at least 1500. Knoop hardness is a scale for describing the resistance of a material to indentation or scratching. The large ceramic particles impart abrasion resistance to the non-stick coating by deflecting abrasive forces applied to the coating surface.

The large ceramic particles typically have an aspect ratio of greater than 1.5, denoting some irregularity in shape, but preferably no greater than about 2.5 so as not to be plate-like. By "aspect ratio" of a large ceramic particle is meant a ratio of the longest diameter or dimension (major axis or length) of a particle to the greatest distance of the minor dimension (height) measured perpendicular to the longest diameter of a particle as shown in FIG. 1 of U.S. Pat. No. 6,291,054. The aspect ratio is a means of quantifying a particle shape.

Examples of inorganic filler film hardeners include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllium oxide (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850). The ceramic might also be considered as an oxide, nitride, boride, or carbide of a metal element. The large ceramic particles can be particles of a single ceramic or a mixture of particles of different ceramics. A preferred large ceramic particle is SiC. Another preferred large ceramic particle is $Al_2O_3$.

Additional components may be present in the non-stick finish used in the present invention. For example, one or more layers may contain small particle size inorganic film hardener, i.e. inorganic film hardener having an average particle size of less than 5 μm, preferably less than about 3 μm, and more preferably less than about 1 micrometer. The identity of the small particle size inorganic film hardener can be the same as for the large ceramic particles, except that the large and small particles do not have to have the same particle identity. The presence of the small particles of inorganic film hardener tends not to increase the abrasion resistance of the non-stick coating obtained from the composition used in the present invention, but does increase the hardness of the coating and thereby may further improve its resistance to scratching.

The non-stick finish may further contain an adhesion promoter. An adhesion promoter is a material normally present in the primer layer to adhere the primer layer to the uncoated substrate, such as of metal, glass or ceramic material. Because of its non-stick property the fluoropolymer in the primer layer does not adhere to the uncoated substrate and thus does not perform the adhesion promoter function. The fluoropolymer present in the midcoat and topcoat layers is also not an adhesion promoter, notwithstanding that this fluoropolymer will adhere one layer to an adjacent layer that contains fluoropolymer during the baking process, i.e. to provide intercoat adhesion. A small amount of adhesion promoter can be present in the midcoat composition used in the present invention to obtain intercoat adhesion when the primer layer onto which the midcoat composition is coated does not contain fluoropolymer. Since the presence of adhesion promoter in the layer formed from such composition tends (a) to detract from the non-stick property of the exposed surface of such layer and (b) increases the difficulty in the spray application of the composition in the form of an aqueous dispersion, the amount of adhesion promoter should be as small as possible. Preferably, the amount of adhesion promoter present in the composition, if present, is no greater than about 8 wt %, more preferably no greater than about 5 wt %, based on the weight of the fluoropolymer in the midcoat layer. The composition can also be substantially free of adhesion promoter, i.e. containing less than 2 wt %, preferably less than 1.5 wt %, and more preferably less than 1 wt % adhesion promoter, these weights being based on the weight of the fluoropolymer in the composition.

The adhesion promoter generally does not contain fluorine. Typical adhesion promoters are those used in primer layers, such as colloidal silica and/or thermally stable polymers, typically called polymer binders. While the polymer binder is generally non-fluorine containing, it adheres to the fluoropolymer as well as the substrate to which the primer is applied. In the present case, the adhesion promoter promotes intercoat adhesion, especially when the primer, while containing polymer binder, contains no fluoropolymer. Preferred polymer binders are those that are soluble or solubilized in water or a mixture of water and organic solvent for the binder, which solvent is miscible with water. This solubility aids in the blending of the binder with the fluoropolymer component in the aqueous dispersion form.

An example of the binder component is polyamic acid salt, which converts to polyamideimide (PAI) upon baking of the composition. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Examples of other binders suitable for use with the present invention include polyimide (PI), polyphenylene sulfide (PPS), polyether sulfone (PES), polyarylene-etherketone, polyetherimide, and poly(1,4(2,6-dimethylephenyl)oxide) commonly known as polyphenylene oxide (PPO). All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneether-ketones are thermally stable at temperatures of at least 250° C. and melt at temperatures of at least 300° C.

For simplicity, only one polymer binder may be used to form the adhesion promoter component, if present, of the midcoat layer. However, multiple polymer binders are also contemplated for use in this invention. This is particularly true for the use of polymer binder in the primer layer. Preferred polymer binders are at least one polymer selected from the group consisting of PAI, PES, and PPS. This preference applies the polymer binder used in the primer and in the midcoat, if adhesion promoter is present in the midcoat.

The non-stick coating of the present invention may contain other filler materials having a Knoop hardness value of less than 1200 in one or more layers making up the non-stick coating. Suitable additional fillers include glass flake, glass bead, glass fiber, aluminum or zirconium silicate, mica, metal flake, metal fiber, fine ceramic powders, silicon dioxide, barium sulfate, talc, etc. that might be used in the primer, midcoat and/or topcoat layers. The non-stick coating may also contain pigment, the amount of which will depend on the color desired and the particular pigment being used.

Each of the layers of the non-stick coating of the present invention can be applied sequentially to the substrate by conventional means, preferably in the form of a liquid medium, and more preferably wherein the liquid of the medium comprises water and the composition being applied to the substrate is an aqueous dispersion. The primer can be any of the primers disclosed in the prior art, typically containing adhesion promoter, such as described above and fluoropolymer as the essential ingredients. Multiple polymer binders can be used in the primer, especially when certain end-use properties are desired, such as flexibility, hardness, or corrosion protection. Common combinations include PAI/PES, PAI/PPS, PAI/PPS/PES PES/PPS. The adhesion promoter in the primer may also include a combination of different adhesion promoters, e.g. colloidal silica and polymer binder.

The primer contains adhesion promoter and the adhesion promoters described above as possibly being used in the midcoat can be used in the primer. The preferred adhesion promoters used in the primer include at least one of PAI, PES, and PPS. The large ceramic particles (average size of at least 10 μm) used in the primer layer are present in an effective amount to increase the abrasion resistance of the non-stick coating. Typically, this will require the presence of at least 3 wt % of the large ceramic particles in the primer layer, based on the total weight of the primer layer (dry solids basis). The primer layer may also contain up to 60 wt % of the large ceramic particles, based on the weight of the primer layer (dry solids basis). The primer layer may also contain inorganic film hardener having an average particle size of less than 5 μm as described above. The use of a fluoropolymer in the primer layer is preferred, but is not necessary for the practice of the present invention. Thus, the primer can be substantially free of fluoropolymer, i.e. will contain less than 10 wt % of fluoropolymer, preferably less than 5 wt % of fluoropolymer, based on the weight of solids in the primer layer composition. The reference to solids weights herein refers to weight after baking.

Generally, the fluoropolymer will comprise 10-45 wt % of the primer layer, when present in the primer layer, at least 70 wt % of the midcoat layer, and at least 90 wt % of the topcoat layer. All of these weight percentages are based on solids.

In one embodiment, a liquid coating composition for the midcoat can include a fluoropolymer composition, a polymer binder, and inorganic whiskers. The amount of inorganic whiskers in this coating composition can be selected to optimize the scratch resistance performance of the non-stick finish. In some embodiments, a small amount of inorganic whiskers may be sufficient to impart improved scratch resistance of the non-stick finish system, while in other embodiments more inorganic whiskers may be used. An optimal amount of inorganic whiskers for use in a non-stick finish system may also depend on the physical dimensions of the whiskers. A limit may be reached at which addition of inorganic whiskers to the liquid coating composition may adversely affects the rheological properties of the liquid coating composition, and in some cases cause the liquid coating composition to form a gel. In the case of a gelled composition, application of the composition to form a uniform coating may prove difficult using well-known liquid coating methods. In one embodiment, the liquid coating composition contain from about 0 to 40 wt % inorganic whiskers.

Spray and roller applications forming each layer are the most convenient application methods, depending on the substrate being coated with primer. Other well-known coating methods including dipping and coil coating are suitable. The midcoat can be applied by conventional methods onto the primer layer prior to its drying. However, when the primer and midcoat compositions are aqueous dispersions, the midcoat composition can be applied to the primer layer preferably after drying to touch. The same is true for application of the topcoat layer to the midcoat layer. The topcoat composition can be any of the published topcoat fluoropolymer compositions. When the primer layer is made by applying the primer composition from an organic solvent, and the midcoat layer is applied from an aqueous medium, the primer layer should be dried so that all water-incompatible solvent is removed before application of the midcoat. The adhesion properties of the primer to the substrate and intercoat adhesion will manifest themselves upon drying and baking of the midcoat layer together with the drying and baking of the primer and topcoat to form the non-stick finish on the substrate.

The resultant composite layered structure can be baked to fuse all the coatings at the same time to form a non-stick finish on the substrate. When the fluoropolymer is PTFE, a quick high bake temperature is preferred, e.g., for 5 min. at a temperature starting at 800° F. (427° C.) and rising to 815° F. (435° C.). When the fluoropolymer in the primer or the midcoat is a blend of PTFE and FEP, e.g., 50-70 wt % PTFE and 50-30 wt % FEP, the bake temperature may be reduced to 780° F. (415° C.), rising to 800° F. (427° C.) in 3 minutes (total bake time).

The resultant coated substrate preferably has a primer layer that is no greater than 0.8 mils (20 μm) thick, more preferably 0.4 to 0.8 mils (10-20 μm) thick. Preferably the midcoat layer is thicker than the primer layer and is more preferably at least 50% thicker. Preferably the midcoat layer is 0.6 to 1.2 mils (15-30 μm) and the topcoat layer is 0.2 to 0.5 mils (5-12 μm) thick. The thickness of the layers that contain large ceramic particles is measured by the eddy-current principle (ASTM B244) after baking. The eddy current values reflect an average of values across the substrate including the height of large particle and the depth of the valleys between particles. This method is further described under Test Methods as applied to the building-up of the layers of coating on a substrate in the formation of the non-stick coating. The primer layer thickness can also be measured on the baked non-stick coating by sectioning the coated substrate, e.g. frying pan, and measuring the thickness from a micrograph obtained from a scanning electron microscope (SEM). By using SEM, a distinction can be made between the height of the large particles and the depth of the valley between particles. SEM values that report the primer thickness in the valley between particles are about 50% of reported eddy current values.

The substrate used in the present invention can be a metal or ceramic, examples of which include aluminum, anodized aluminum, cold-rolled steel, stainless steel, enamel, glass, and pyroceram. These materials may form the entire substrate or in the case of composite materials, just the surface of the substrate. The substrate can be smooth, i.e. having a surface profile of less than 50 microinches (1.25 μm) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum.

Products having non-stick finishes of the present invention include cookware, bakeware, rice cookers and inserts thereof, water pots, iron sole plates, conveyors, chutes, roll surfaces, cutting blades, etc.

Test Methods

Mechanical Tiger Paw Abrasion Test (MTP Abrasion Test)

A coated substrate is evaluated for abrasion resistance by continuously rotating three weighted ballpoint pen tips on the surface of the coated substrate while the substrate is heated and oscillated back and forth on a shaker table. The testing equipment used to perform the MTP Abrasion Test is shown and described in FIGS. 1, 2 and 3 of U.S. Pat. No. 6,761,964.

In operation, a test pan with a coated aluminum substrate is washed in mild detergent to remove any dirt or oil. The test pan is placed on a hot plate with the aid of a removable centering rod temporarily installed in a central drive shaft. The centering rod acts a plumb line for pan placement on a surface of the hot plate after which the centering rod is removed. The test pan is subjected to the action of a tiger paw head. A tiger paw head is a disc with channels for housing three ballpoint pen refills that are free of damage prior to use. For each test, three new pen refills are installed in channels of the tiger paw head so that each refill extends downward ¾ inch (1.9 cm) from the bottom of a rotating disc. The tiger paw head is attached to a floating shaft that extends down from the drive disc attached to the drive shaft. The weight of the tiger paw head and floating shaft is regulated. In the equipment illustrated in U.S. Pat. No. 6,761,964, the weight is approximately 400 g. The combined weight of the floating shaft and washers (all approximately 115 g), the tiger paw head (approximately 279 g), and the ballpoint pen points (approximately 10 g) totals 404 g. The counterbalancing weight also totals approximately 400 g.

The hot plate is turned on and the test substrate (test pan) is heated to a temperature of 400° F.±10° F. (204° C.±6° C.). When the pan reaches test temperature as determined by infrared temperature measurement on the substrate surface, the pen refills are lowered onto the pan and the equipment is activated to begin the shaker table oscillation and tiger paw head rotation. In this way, the testing equipment rotates the pens against and around the surface of the coated substrate. The speed of tiger paw head rotation is controlled at 30 rotations per minute. The speed of the shaker table is controlled for 30 back and forth oscillations per minute. A counter records the number of cycles completed. A timer counts down each 15-minute period of tiger paw rotation in a particular direction. Data is recorded at 15-minute intervals. The rotation of the tiger paw head is reversed after each 15-minute period. Periodically the pen refill points are inspected for build-up of coating. Built-up coating is removed as necessary.

Failure of the coating on the substrate (test pan) is monitored by observing the oval-shaped paths that evolve as the points of the pen refills penetrate through the coating to reach the bare metal substrate. By heating the substrate, the time to failure is accelerated. Thus, the longer the time to failure, the better the durability of the non-stick coating.

At the end of each 15-minute cycle, the pan is evaluated according to the following MTP numerical ratings:

| | |
|---|---|
| 10 | New Pan |
| 9 | Grooves in coating |
| 8 | First nick to metal (for smooth substrates) |
| | Roughening of surface (for grit blasted substrates) |
| 7 | Lines to metal (outside and/or inside) |
| 6 | Oval beginning outside |
| 5 | Oval complete |

Mechanical Utensil Scratch Test (MUST)

The purpose of the MUST is to quantify the cut through and scratch resistance of a reinforced PTFE coating. In this test, the coating is applied in a vessel, pan, pot, baking plate, etc, either made of stainless steel or aluminum. The surface of the coating is scratched repeatedly with a stylus (e.g., a ball pen refill) in a linear path until the substrate is reached, indicating the end point of the test. The number of cycles to the end point are counted and used to evaluate scratch resistance. Accordingly, the harder and more resistant to scratch that a coating is, the higher will be the number of cycles.

A modified SBAR machine is used to perform the MUST test by replacing the abrasive element with a scratching head that holds the stylus. This scratching head may be a pen refill Paper Mate 91534 with a tungsten carbide 1.0 mm ball; as recommended by the British Standard Specification for Cookware BS 7069:1988. The bar has a weight of 630 g and can be further loaded to increase the severity of the test or unloaded to decrease severity if the test is too severe. The temperature of the vessel is set at 200° C. by adjusting the power of a hot plate used to heat the vessel. In these Examples, the bar is used without extra load. The MUST is performed five times on each test pan, and a new pen refill is used for each scratch test. The scratches are made in the middle of the pan with a 1 cm separation between each test. Thus, for a 24 cm pan the four tests can be at 10.0 cm, 11.0 cm, 12.0 cm, 13.0 cm and 14.0 cm from one side of the pan edge.

Dried Film Thickness (DFT)

The baked coating thickness is measured with a film thickness instrument, e.g., Fisherscope, based on the eddy-current principle (ASTM B244). Because of the presence of large particles in the coatings, the thickness determination is done on coupons placed in the test pan. To prepare the coupons one coupon is attached to the test pan and two adjacent spots are taped prior to any application of the coating. The primer is applied and one tape is removed to expose the bare metal substrate of the test pan over which a second coupon is placed. The midcoat is subsequently applied and the second tape is removed to once again expose the bare metal substrate over which a third coupon is applied. Measurement of the first coupon provides total thickness of all three coatings—primer, midcoat and topcoat. Measurement of the second coupon provides thickness of the midcoat and topcoat. Measurement of third coupon provides thickness of the topcoat. Individual values for primer thickness and midcoat thickness are calculated by from the differences in thickness of the three coupons. Primer thickness is determined by subtracting the value of the thickness of the second coupon from the first coupon. Midcoat thickness is determined by subtracting the thickness of the third coupon from the second coupon.

Fluoropolymer

PTFE dispersion: DuPont PTFE fluoropolymer dispersion with a solids content of from 59 to 61 wt % and RDPS of from 200 to 240 nanometers. PTFE fluoropolymer dispersion grade 30 is available from the DuPont Company, Wilmington, Del.

FEP dispersion: TFE/HFP fluoropolymer dispersion with a solids content of from 54.5 to 56.5 wt % and RDPS of from 160 to 220 nanometers, the resin having an HFP content of from 9.3 to 12.4 wt % and a melt flow rate of 11.8-21.3 g/10 min measured at 372° C. by the method of ASTM D-1238 modified as described in U.S. Pat. No. 4,380,618.

PFA dispersion: DuPont PFA fluoropolymer dispersion with a solids content of from 58 to 62 wt % and RDPS of from 180 to 220 nanometers, the resin having an PPVE content of from 2.9 to 3.6 wt % and a melt flow rate of 1-3 g/10 min measured at 372° C. by the method of ASTM D-1238 modified as described in U.S. Pat. No. 4,380,618. PFA fluoropolymer dispersion grade 335 is available from the DuPont Company, Wilmington, Del.

Polymer Binder

PAI is Torlon® AI-10 poly(amide-imide) (Solvay Advanced polymers), a solid resin (which can be reverted to polyamic salt) containing 3-5% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Silicon Carbide (Large Ceramic Particles)

Silicon carbide particles are supplied by Elektroschmelzwerk Kempten GmbH (ESK), Munich Germany.
P 600=21.6±1.5 µm average particle size $d_{s50}$
P 400=31.4±1.5 µm average particle size $d_{s50}$
P 320=43.1±1.5 µm average particle size $d_{s50}$
The average particle size is measured by sedimentation using FEPA-Standard-43-GB 1984R 1993 resp. ISO 6344 according to information provided by the supplier.

Silicon Carbide (Inorganic Whiskers)

Beta phase (cubic) silicon carbide whiskers, 99% (metals basis) are supplied by Alfa Aesar (a Johnson Matthey Co., Ward Hill, Mass.).
Diameter—typical 1-3 µm (nominal)
Length—typical 5-60 µm (nominal).

Aluminum Oxide

Aluminum oxide (small particles) are supplied by Aluminum Corporation of America—Grade SG A-16 with an average particle size 0.35-0.50 µm.

EXAMPLES

Example 1

Example 1 demonstrates that unexpected improvement in scratch resistance is obtained in a 3-coat non-stick finish system with the combination of large ceramic particles in the primer layer and inorganic whiskers in the midcoat layer. The combination of improved scratch resistance and good abrasion resistance performance is greater than that expected based on the individual contributions of each component.

A 3-coat non-stick system representative of the invention is sprayed onto test pans of smooth aluminum that have been treated by washing to remove grease, but have not been mechanically roughened. The aqueous dispersion compositions of the primer, midcoat and topcoat layers are listed in Tables 1, 2 and 3 respectively. The primer layer is sprayed and dried. The midcoat layer is sprayed over the dried primer while the topcoat layer is applied wet on wet over the midcoat layer. The 3-coat system is cured by baking at 430° C. Typical dry film thicknesses (DFT) of the primer layer range from about 10 to 20 µm, the midcoat layer DFT is about 20 µm while the topcoat thickness is in a range from about 5 to 12 µm.

TABLE 1

Primer liquid composition

| Ingredient | P-I (g) | P-II (g) |
|---|---|---|
| Water | 39.53 | 39.53 |
| Furfuryl Alcohol | 2.63 | 2.63 |
| Alkylethoxy nonionic surfactant | 0.14 | 0.14 |
| Aluminium oxide (40% solids dispersion) | 16.79 | 16.79 |
| Carbon black pigment (27.0% solids dispersion) | 0.73 | 0.73 |
| Ultramarine blue pigment (52.3% solids dispersion) | 1.41 | 1.41 |
| PAI (28.2% solids dispersion) | 17.35 | 17.35 |
| PTFE (60.0% solids dispersion) | 4.88 | 4.88 |
| FEP (55% solids in aqueous dispersion) | 3.56 | 3.56 |
| Ludox AM polysilicate (30% solids dispersion) | 2.63 | 2.63 |
| SiC P600 | 6.80 | 0 |
| SiC P320 | 3.40 | 0 |
| Surfynol 440 surfactant | 0.15 | 0.15 |

TABLE 2

Midcoat liquid composition

| Ingredient | M-I (g) | M-II (g) |
|---|---|---|
| PTFE (60.0% solids dispersion) | 51.80 | 51.80 |
| Water | 7.6 | 7.6 |
| Mica Iriodin 153 from MERCK | 0.63 | 0.63 |
| Aluminium oxide (40% solids dispersion) | 5.19 | 5.19 |
| Ultramarine blue pigment (52.3% solids dispersion) | 0.44 | 0.44 |
| Carbon black pigment (27.0% solids dispersion) | 4.71 | 4.71 |
| Acrylic resin (40% solids dispersion) | 13.49 | 13.49 |
| Triethanolamine | 5.63 | 5.63 |
| Cerium octoate | 0.55 | 0.55 |
| Oleic acid | 1.15 | 1.15 |
| Butylcarbitol | 1.46 | 1.46 |
| Solvesso 100 Hydrocarbon | 1.82 | 1.82 |
| SiC whiskers | 2.12 | 0 |
| PAI (28.2% solids dispersion) | 3.41 | 3.41 |

TABLE 3

Topcoat liquid composition

| Ingredient | (g) |
|---|---|
| PTFE (60.0% solids dispersion) | 63.51 |
| Water | 8.93 |
| PFA (60.0% solids dispersion) | 3.34 |
| Mica Iriodin 153 from MERCK | 0.40 |
| Cerium octoate | 0.59 |
| Oleic acid | 1.25 |
| Butylcarbitol | 1.57 |
| Triethanolamine | 6.04 |
| Solvesso 100 hydrocarbon | 1.97 |
| Acrylic resin (40% solids dispersion) | 12.40 |

Four different 3-coat non-stick finish systems are made using the combinations of primers, with (P-I) and without (P-II) large ceramic particles, and midcoats with (M-I) and without (M-II) inorganic whiskers. The topcoat is the same in all cases. All the items are tested in MUST. The dry film composition of midcoat MI containing silicon carbide whiskers is listed in Table 4.

TABLE 4

Midcoat M-I dry composition

| Ingredient | weight percent |
|---|---|
| PTFE | 81.43 |
| Mica Iriodin 153 from MERCK | 1.57 |
| Aluminium oxide | 5.15 |
| Ultramarine blue pigment | 0.56 |
| Carbon black pigment | 3.66 |
| SiC whiskers | 5.24 |
| PAI | 2.39 |
| Total | 100 |

Table 5 shows a summary of results for the four different systems (A-D). All the samples were sprayed in similar conditions and showed comparable DFT values. Results are normalized to a 40 microns total DFT for the 3-coat coating systems.

TABLE 5

| Coating system | Primer | Midcoat | MUST cycles | MTP rating (180 minutes) |
|---|---|---|---|---|
| A | P-II | M-II | 59 | 5 |
| B | P-II | M-I | 56 | 5 |
| C | P-I | M-II | 66 | 9 |
| D | P-I | M-I | 79 | 9 |

Coating system A has no silicon carbide particles in the primer nor silicon carbide whiskers in the midcoat. Under MUST scratch resistance testing, it lasts 59 cycles, and the MTP abrasion resistance is 5 after a 180 minute test. The addition of silicon carbide whiskers alone to the midcoat (system B) does not significantly impacted the performance under either scratch resistance or abrasion resistance. On the other hand, the addition of silicon carbide particles in the primer improves both the scratch and abrasion performance (system C), where the coating system shows some improvement in scratch testing, resisting 66 cycles under MUST, and a significant improvement in abrasion testing, with an MTP rating of 9.

System D contains silicon carbide particles in the primer and silicon carbide whiskers in the midcoat. The combination of these two factors results in a significant improvement of the scratch resistant performance to 79 cycles under MUST, along with a strong improvement in abrasion resistance (MTP rating of 9). This improvement in scratch resistance would not have been predicted from the separate contributions of inorganic whiskers in the midcoat (system B) and large ceramic particles in the primer (system C). While not bound by theory, it is believed by the inventors that there is an interaction between particles in the primer and whiskers in the midcoat that results in the enhancement of the coating scratch resistant property. This improvement may be explained by the coating structure obtained. The large particles in the primer are strongly anchored to the substrate by the primer layer while the whiskers in the midcoat form a network surrounding the large particles. When a scratching tool is used against the coating surface of the 3-coat finish system, the scratching force is distributed by the whiskers into multiple, smaller force components that are then transmitted to the large particles and therefore to the substrate. Consequently, the coating structure is able to effectively dissipate the force in the coating matrix, reducing the surface damage that would occur if the force was not dissipated.

Example 2

Example 2 demonstrates the change in scratch resistance of a 3-coat non-stick finish system when the amount of inorganic whiskers included in the midcoat layer is varied.

A 3-coat non-stick system representative of the invention is sprayed onto test pans of smooth aluminum that have been treated by washing to remove grease, but has not been mechanically roughened. The aqueous dispersion composition of the primer (P-II) is listed in Table 6. In this case, three different particle sizes of silicon carbide are used. Five different midcoats were prepared based on the formulation listed in Table 2 and changing the silicon carbide whiskers content in a range from 0 to 20 wt % of the total weight of the wet formulation. The primer layer is sprayed and dried. The midcoat layer is sprayed over the dried primer while the topcoat layer is applied wet on wet over the midcoat layer. The 3-coat system is cured by baking at 430° C. Typical dry film thicknesses (DFT) of the primer layer range from about 10 to 20 μm, the midcoat layer DFT is about 20 μm while the topcoat thickness is in a range from about 5 to 12 μm.

TABLE 6

Primer P-III Composition

| Ingredient | weight percent |
|---|---|
| Water | 39.53 |
| Furfuryl Alcohol | 2.63 |
| Alkylethoxy nonionic surfactant | 0.14 |
| Aluminium oxide (40% solids dispersion) | 16.79 |
| Carbon black pigment (27.0% solids dispersion) | 0.73 |
| Ultramarine blue pigment (52.3% solids dispersion) | 1.41 |
| PAI (28.2% solids dispersion) | 17.35 |
| PTFE (60.0% solids dispersion) | 4.88 |
| FEP (55% solids in aqueous dispersion) | 3.56 |
| Ludox AM polysilicate (30% solids dispersion) | 2.63 |
| SiC P600 | 3.40 |
| SiC P400 | 3.40 |
| SiC P320 | 3.40 |
| Surfynol 440 surfactant | 0.15 |
| Total | 100 |

The MUST test (e.g. showing scratch resistance) is applied to coated test pan samples which are sprayed in similar conditions and show comparable DFT values. For coating systems having greater than 0 to less than 40 wt % of SiC whiskers (in the total liquid composition weight of the midcoat), the MUST cycle performance demonstrates improvement in scratch resistance. It is preferable that the coating systems have greater than 0 to less than 20 wt % SiC whiskers; more preferably, 1 to less than 15 wt % SiC whiskers; still more preferably, 2.5 to 10 wt % SiC whiskers for improved MUST cycle performance. It is most preferable for the coating systems to have 3 to 7 wt % SiC whiskers for the most improved MUST cycle performance (i.e. optimal scratch resistance).

Thus, for example a 3-coat non-stick finish system, it is believed that optimal scratch resistance will be achieved when the midcoat contains in the range of about of 3 to 7 wt % SiC whiskers in the liquid composition. It can be expected that for a particular non-stick finish system, the scratch resistance can be optimized by adjusting the inorganic whisker content of the midcoat based on the size and loading of the large ceramic particles in the primer. It is thus believed that an optimal range of inorganic whiskers in the midcoat will vary depending on the composition of the primer as well as the morphologies of both the inorganic whiskers and the large ceramic particles.

Note that not all of the activities described above in the general description or the examples are required, that a portion of a specific activity may not be required, and one or more that further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more, problems, or any combination thereof has been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. Further, reference to values stated in ranges include each and every value within that range.

What is claimed is:

1. An article comprising a scratch resistant non-stick finish adhered to a substrate, wherein the scratch resistant non-stick finish comprises a primer layer, a midcoat layer, and a topcoat layer, wherein:
   the primer layer is adhered to the substrate and comprises a first polymer binder and ceramic particles having an average particle size in the range of from about 10-50 μm;
   the midcoat layer comprises a first fluoropolymer composition and inorganic whiskers; and
   the topcoat layer comprises a second fluoropolymer composition.

2. The article of claim 1, wherein the inorganic whiskers comprise silicon carbide.

3. The article of claim 1, wherein the inorganic whiskers have a fiber aspect ratio of at least 3.3.

4. The article of claim 1, wherein the inorganic whiskers have a diameter in the range of from about 0.45 to 3 μm.

5. The article of claim 1, wherein the inorganic whiskers have a length in the range of from about 5 to 80 μm.

6. The article of claim 1, wherein a composition of the midcoat layer comprises inorganic whiskers in the range of from greater than 0 to about 55 percent by weight in a dry film.

7. The article of claim 1, wherein the large ceramic particles comprise silicon carbide.

8. The article of claim 1, wherein the midcoat layer further comprises a second polymer binder.

9. The article of claim 8, wherein a composition of the midcoat layer comprises the second polymer binder in the range of from about 1 to 20 percent by weight in a dry film.

10. The article of claim 8, wherein the second polymer binder comprises polyamide imide.

11. The article of claim 1, wherein the primer layer further comprises a third fluoropolymer composition.

\* \* \* \* \*